United States Patent [19]

Lougee

[11] Patent Number: 4,776,571
[45] Date of Patent: Oct. 11, 1988

[54] MATERIAL HANDLING SYSTEM

[75] Inventor: John R. Lougee, Brunswick, Me.

[73] Assignee: Bath Iron Works Corporation, Bath, Me.

[21] Appl. No.: 78,717

[22] Filed: Jul. 28, 1987

[51] Int. Cl.⁴ .............................................. B23K 7/02
[52] U.S. Cl. .................................................... 266/49
[58] Field of Search ......................................... 266/49

[56] References Cited

U.S. PATENT DOCUMENTS

| | | | |
|---|---|---|---|
| 3,743,260 | 7/1973 | Alleman et al. | 266/49 |
| 4,220,318 | 9/1980 | Anderson et al. | 266/49 |
| 4,341,374 | 7/1982 | Seelinger | 266/49 |
| 4,524,955 | 6/1985 | Boardman | 266/49 |

Primary Examiner—Wayland Stallard
Attorney, Agent, or Firm—Shlesinger, Arkwright & Garvey

[57] ABSTRACT

The present invention discloses a material handling system including a loading conveyor, a material processing conveyor, a cutting instrument, and a water table operably associated with the material processing conveyor. The material processing conveyor includes an endless belt having first and second sprocket chains and a plurality of support members extending therebetween. The ends of the support members are connected to the corresponding sprocket chains via U-shaped connectors. The water table is maintained in the storage position while the processing conveyor is operating. Once movement of the processing conveyor has ceased, the water table is raised to an operating position so that the by-products of the cutting operation will be collected therein. The U-shaped connectors receive the side walls of the water table E. The U-shaped connectors obviate the need for elaborate end wall systems which are extremely expensive and time consuming to operate.

31 Claims, 5 Drawing Sheets

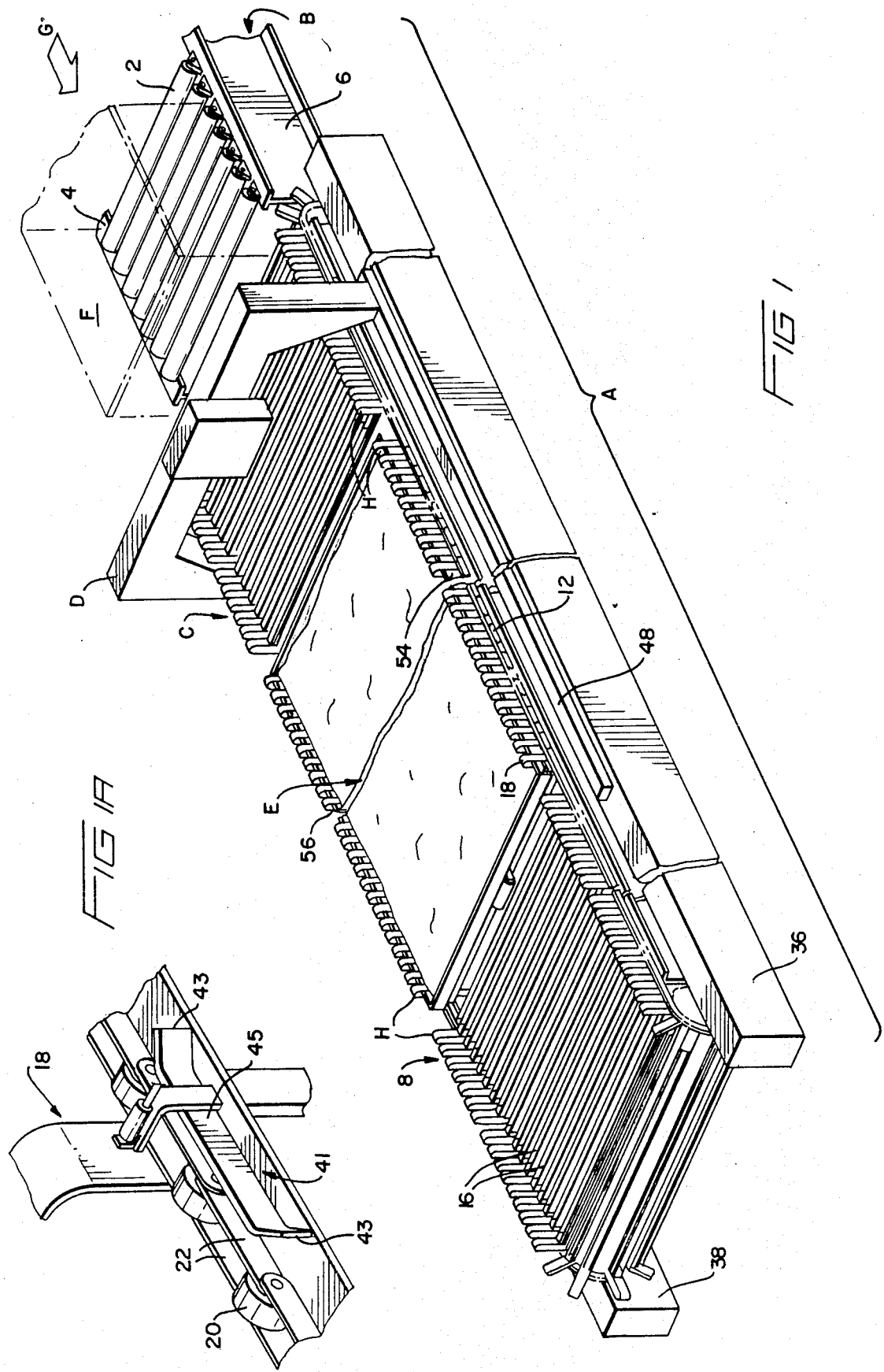

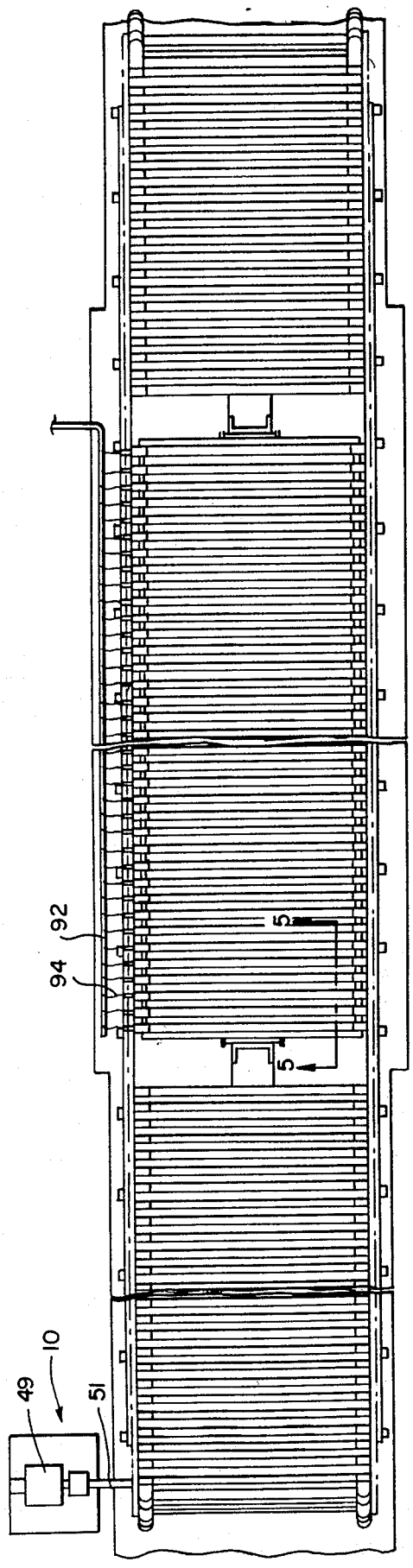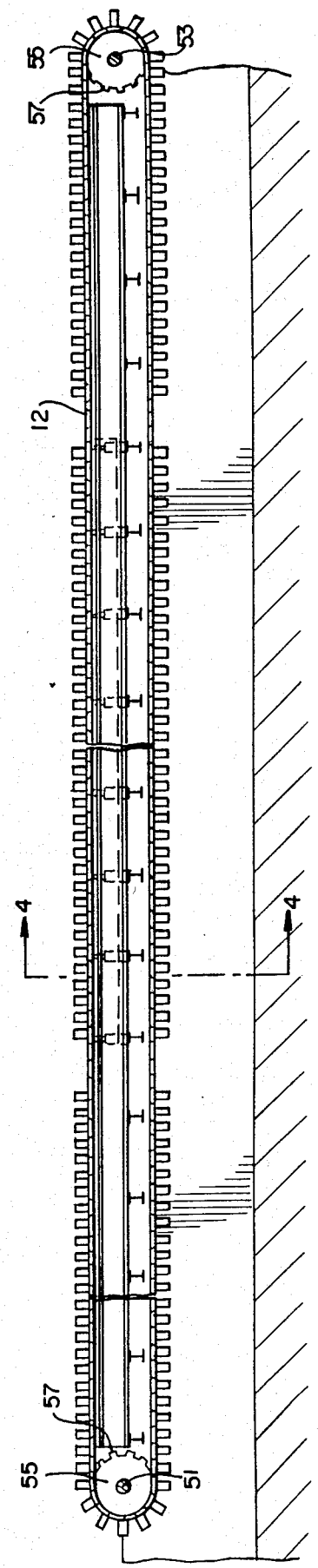

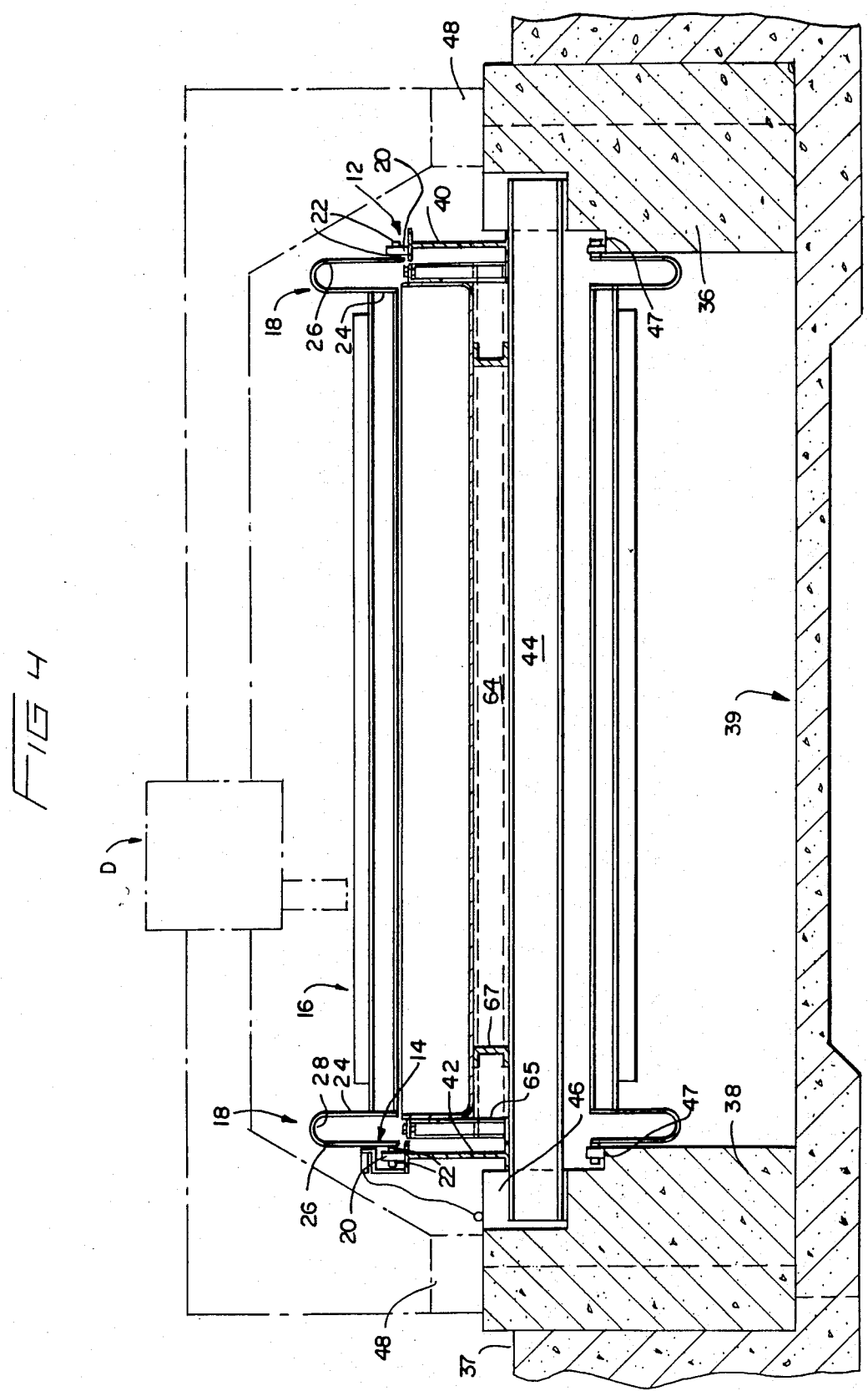

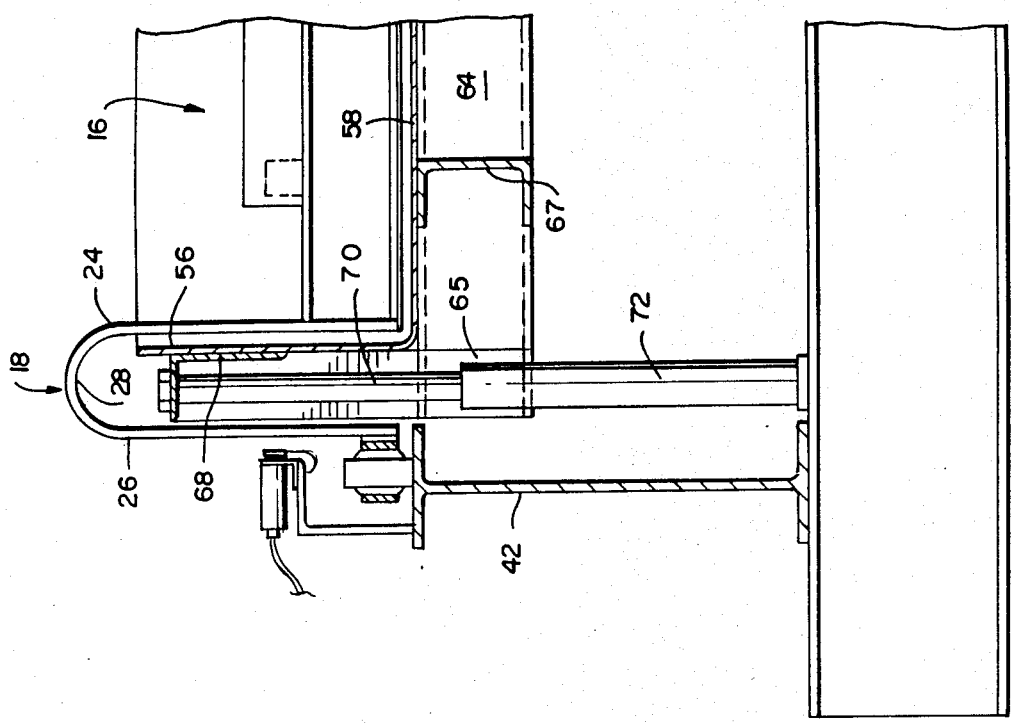
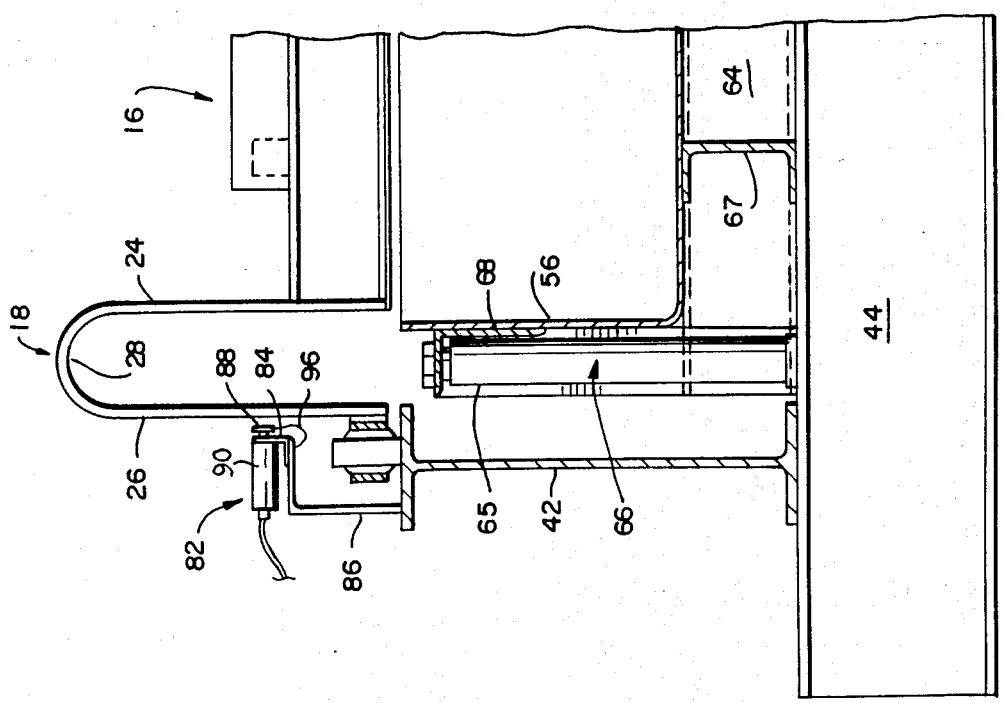

MATERIAL HANDLING SYSTEM

FIELD OF THE INVENTION

This invention pertains to material handling systems for transporting materials from a loading area to an operating area, wherein the materials are processed, and subsequently to an unloading area.

BACKGROUND OF THE INVENTION

A number of material handling systems have been designed for processing matrials to a users specifications. The following U.S. Patents disclose examples of previously known material handling systems: 3,486,744, Beyers et al; 3,526,395, Brown; 3,743,260, Alleman et al; 3,792,846, Geffert; 3,821,840, Kershaw; 3,851,864, Miller; 4,097,713, Dunshee; 4,162,060, Anderson et al; 4,220,318, Anderson et al; 4,341,374, Seelinger; 4,358,091, Talanda; 4,453,702, Anderson et al.

Several of the aforementioned U.S. Patents implement a conveyor system for maximizing the efficiency of the material handling system. The conveyor systems are designed to transport the material from a loading area to an operating area where the material is subsequently processed. The material handling systmes customarily use flame cutting machines or the like for processing the materials. The flame cutting machines emit a number of pollutants, such as smoke, noise and harmful light rays, to the environment. The previously known material handling systems have used water tables to reduce the pollutants emitted by the flame cutting machines. In these material handling systems the entire conveyor, including the chains, is passed through the water table. This feature has resulted in elaborate designs for water tables that are extremely expensive and labor intensive to manufacture. Further, a number of the conveyor type material handling systems have fixed the water table in a stationary position. The water in the stationary water table is maintained at a first level to enable the conveyor to pass therethrough. Once the material is located adjacent the operating area, the water level is raised and the processing steps commenced. The additional step of raising and lowering the water level in the water table has significantly reduced the efficiency of the previously known material handling systems. Additionally, since the chains of the conveyor systems are passed through the water table they have experienced fatal corrosion due to their exposure to the water in the water table and the residue produced during the processing steps.

OBJECTS AND SUMMARY OF THE INVENTION

An object of the present invention is to provide an improved material handling system.

Another object of the invention is to provide a material handling system with a water table for significantly reducing the pollutants emitted to the surrounding environment.

A further object of the invention is to provide a water table that can be readily and inexpensively manufactured.

Yet another object of the invention is to provide a water table having a constant water level that is displaceable between an operating position and a storage position.

A further object of the invention is to provide a conveyor system having a drive chain mechanism that is free from corrosion due to exposure to the liquids contained in the water table and the residue produced during the processing of the materials.

Another object of the present invention is to provide a water table with end walls, side walls and a bottom plate which maintain a fixed relationship to one another during all phases of the material handling system.

A further object of the invention is to provide guide members operably associated with the water table to ensure alignment thereof when moved between the storage and operating positions.

Yet another object of the invention is to provide a plurality of pneumatic actuators operably associated with a conveyor system for grounding the material handling system during the processing stage thereof.

Another object of the present invention is to provide a processing conveyor that is positioned at substantially the recommended height above the surrounding shop room floor needed to accommodate the cutting instrument.

In summary, the material handling system of the present invention includes first and second conveyors for transporting materials from a loading area to an operating area where the materials can be processed to the users specifications. A water table having a continuous level of fluid contained therein is operably associated with the first conveyor adjacent the operating area for preventing emission of pollutants to the surrounding environment. The first conveyor system includes a plurality of U-shaped connectors, a plurality of supporting slats, and first and second chains. The U-shaped connectors join the chains to corresponding ends of the support slats. Further, the U-shaped connectors are adapted to receive the side walls of the water table when raised in the operating position. The chains are thus not exposed to the liquid contained in the water table or any residue produced during the processing stage.

DETAILED DESCRIPTION OF THE DRAWINGS

FIG. 1 is a fragmentary perspective view of the material handling system of the present invention.

FIG. 1A is an exploded view of the guide members for the conveyor system of the present invention.

FIG. 2 is a fragmentary top view of the material handling system of the present invention.

FIG. 3 is a fragmentary side view of the material handling system of the present invention.

FIG. 4 is a cross-sectional view of FIG. 3 taken along lines 4—4 and viewed in the direction of the arrows.

FIG. 6 is a fragmentary exploded view of FIG. 4 depicting the water table in the storage position.

FIG. 7 is fragmentary exploded view of FIG. 4 depicting the water table in the operating position.

DETAILED DESCRIPTION OF THE INVENTION

Figure 5:
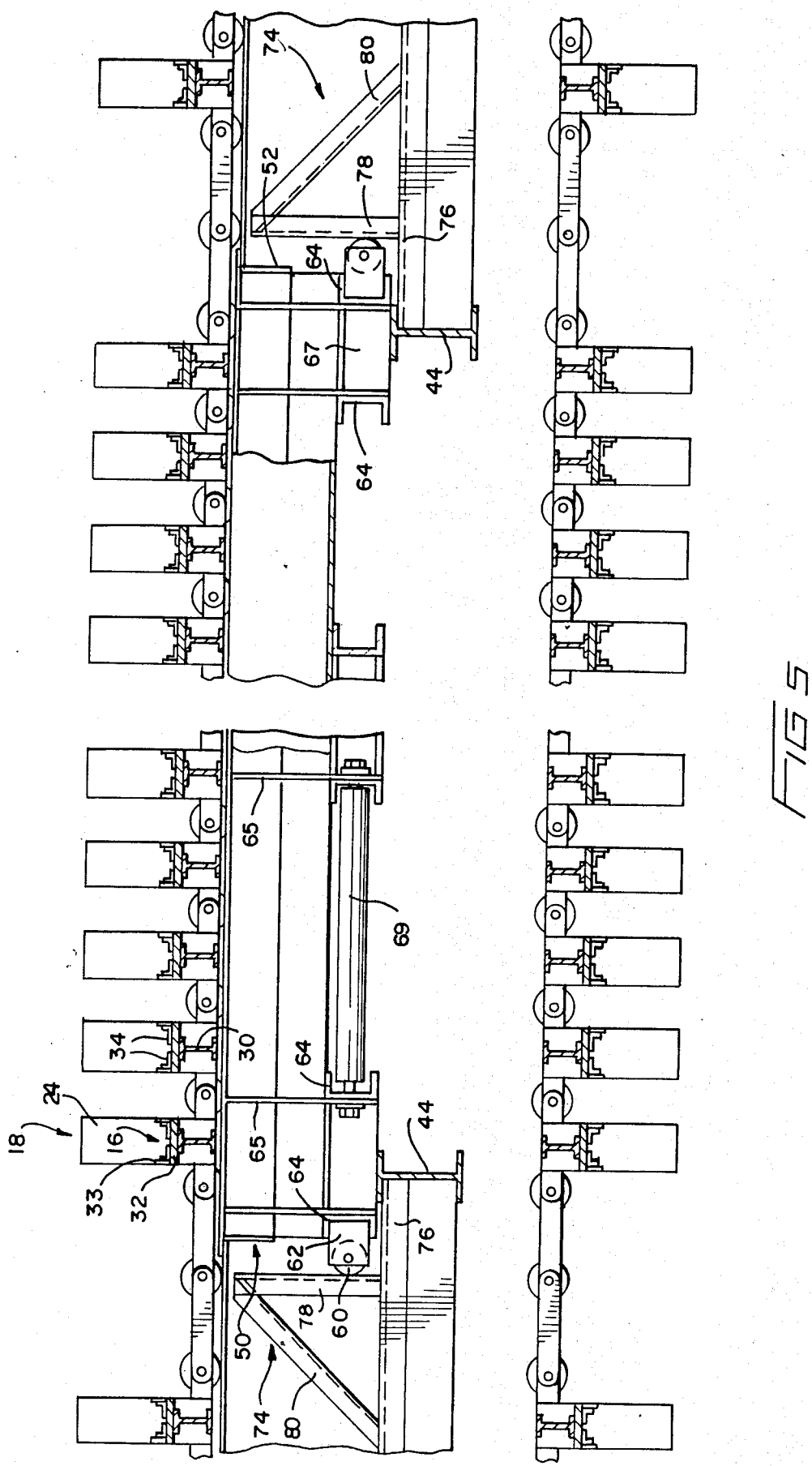
FIG. 5 is an exploded cross-sectional view of FIG. 2 taken along lines 5—5 and viewed in the direction of the arrows.

Referring to FIG. 1, the in line material handling system A of the present invention includes a loading conveyor B, a processing conveyor C, a cutting instrument D, and a water table E. A piece of material F is shown in dotted lines and travels along the material handling system A in the direction indicated by arrow G.

The loading conveyor B includes a plurality of rollers 2. The rollers 2 are supported and rotatably journaled at oppostie ends to I-beams 4 and 6. A drive mechanism (not shown) is operably associated with rollers 2. The drive mechanism only drives every other roller 2. This feature reduces the overall cost of the present material handling system. It will be appreciated by one of ordinary skill in the art that the length of the loading conveyor B can be readily varied to accommodate the specific needs of the user. It will further be appreciated that the processing conveyor C can be extended thus eliminating the need for the loading conveyor B.

The processing conveyor C includes an endless belt 8 and a drive system generally designated 10. The endless belt 8 includes first and second sprocket chains 12 and 14 respectively, best seen in FIG. 4, a plurality of supporting members 16 extending between the first and second sprocket chains 12 and 14, and a plurality of U-shaped connectors 18.

Referring to FIGS. 4 and 5, the first and second sprocket chains 12 and 14 include a plurality of rollers 20 and a pair of chain links 22 operably connecting the adjacent rollers. U-shaped connectors 18 include inner and outer vertically extending walls 24 and 26 respectively. An arcuate upper portion 28 joins inner and outer wall 24 and 26. The inner and outer walls 24 and 26 are spaced a distance greater than the thickness of the side walls of water table E. Referring to FIG. 5, support members 16 each include an I-beam 30, a plurality of supporting plates 32 spaced along and secured to I-beam 30, and a pair of vertically extending slats 33 fastened to opposite ends of the supporting plates 32 via brackets 34.

Referring to FIG. 4, the outer walls 26 of U-shaped connectors 18 are secured to inner chain links 22 by way of bolts or similar fasteners (not shown). The inner walls 24 are secured to the ends of corresponding I-beams 30 by welding or the like.

Side walls 36 and 38 are positioned in a recess in the shop room floor 37. This aspect of the present material handling system permits an operator to positin the work at a height which will accommodate the cutting instrument D. The walls 36 and 38 extend along opposite sides of the processing conveyor C and support the endless belt 8 above the pit bottom 39 such that there is sufficient clearance between the pit bottom 39 and the U-shaped connectors 18 extending along the underside of endless belt 8, as best seen in FIG. 4. More specifically first and second sprocket chains 12 and 14 extend along and are supported by I-beams 40 and 42 respectively. Referring to FIG. 1A, a plurality of guide members 41 extend along I-beams 40 and 42 to ensure proper alignment of sprocket chains 12 and 14. The guide members 41 include ends 43 extending outwardly from base plate 45. The ends 43 direct sprocket chains 12 and 14 inwardly to maintain alignment of the same. A plurality of cross beams 44 extend between side walls 36 and 38 and are received in recesses 46 formed in the inner surfaces thereof. The cross beams 44 support I-beams 40 and 42. The underside of sprocket chains 12 and 14 extend along shoulders 47 formed in side walls 36 and 38. A track 48 extends along side walls 36 and 38 the length of water table E. Cutting instrument D travels along tracks 48. Thus, tracks 48 allow the operator to readily vary the position of the cutting instrument D relative to the material F.

Referring to FIGS. 2 and 3, the drive system 10 is drivingly connected to endless belt 8 and includes a motor and speed reducer 49, a drive shaft 51, a driven shaft 53 and a pair of sprockets 55 nonrotatably mounted on each of the drive and driven shafts 51 and 53. The sprockets 55 include a plurality of teeth 57 for engaging first and second sprocket chains 12 and 14.

Referring to FIG. 1, the water table E includes end walls 50 and 52, side walls 54 and 56, and bottom panel 58. The water table E includes drain and supply valves (not shown) which will enable the operator to readily fill and drain the water table as may be needed. As seen in FIG. 5, the end walls 50 and 52 each include guide rollers 60 rotatably secured thereto via brackets 62. A plurality of C-shaped channels 64 extend transversely across the underside of water table E and are secured thereto via flat bars 65. The channels 64 prevent the water table E from buckling when in the operating position. Channels 67 are secured at each end and extend between adjacent channels 64. Channels 67 are supported by cross beams 44 when water table E is in the storage position. A pair of guide rollers 69 (only one is shown) extend along each of the side walls 54 and 56 adjacent the corners of water table E and are rotatably secured to channels 64. Support bars (not shown) are secured to I-beams 40 and 42 at adjacent each end of guide rollers 69. As seen in FIGS. 6 and 7, a plurality of hydraulic actuators 66 are spaced along the side walls 54 and 56 and secured thereto via L-shaped brackets 68. The hydraulic actuators 66 include pistons 70 and cylinders 72.

Guide brackets 74 are positioned adjacent guide rollers 60 at each of the end walls 50 and 52 of the water table E. Guide brackets 74 each include a horizontally extending member 76 secured to I-beams 44 adjacent end walls 50 and 52 of water table E. A vertical member 78 extends parallel toand is spaced from the corresponding end walls 50 and 52 of water table E. An angularly extending brace 80 is secured at one end to vertical member 78 and at the other end to horizontal member 76.

Referring to FIGS. 6 and 7, a plurality of pneumatic actuators 82 are spaced along I-beam 42. The pneumatic actuators 82 are supported on I-beam 42 via L-shaped brackets 84 and 86. The pneumatic actuators 82 include a piston 88 and a cylinder 90. Each pneumatic actuator 82 is connected to supply line 92 via conduits 94, best seen in FIG. 2. A ground wire 96 connects piston 88 with L-shaped bracket 86.

OPERATION

FIGS. 1, 4, 6 and 7

The operation of the material handling system A of the present invention will now be described. The drive mechanism for loading conveyor B is energized thereby simultaneously rotating rollers 2. The rollers 2 transport the material F to processing conveyor C. The drive mechanism 10 of processing conveyor C is simultaneously energized with the drive mechanism of loading coneyor B. The processing conveyor C transports the material F to a position directly above water table E. When the material F is directly above the water table E, the drive mechanism 10 is deenergized. As is seen in FIG. 6, the water table E is normally maintained in a storage position. In the storage positin, sufficient clearance is provided between the water table E and the endless belt 8 such that the endless belt 8 can revolve freely.

The hydraulic actuators 66 are energized to raise water table E to the position providing optimum water level for the cutting operation as shown in FIG. 7. The side walls 54 and 56 of water table E are received in U-shaped connectors 18. Further, as seen in FIG. 1, the endless belt 8 has a plurality of spaces H strategically placed wherein the endless belt 8 is free from U-shaped connectors 18 and support members 16. Thus, endwalls 50 and 52 are permitted to pass unobstructed through endless belt 8 when the water table E is raised to the operating position. Although the support members 16 are immersed in the water table E, the first and second sprocket chains 12 and 14 are positioned outwardly of side walls 54 and 56 of the water table E. Thus, the sprocket chains 12 and 14 do not experience corrosion due to exposure to liquids in the water table E or the by-products of the cutting operation.

Prior to commencement of the cutting operation the material handling system A is grounded. This is achieved by energizing the pneumatic actuators 82 via supply line 92 and conduits 94. The pistons 88 are thrust against the outer walls 26 of U-shaped connectors 18. In this manner, the material handling system A is grounded. Subsequently, the cutting instrument D is moved along the tracks formed on side walls 20 and 22 such that it is positioned above the material F. The cutting torches (not shown) are energized to form the materials F to the desired configuration. The water table E reduces the pollutants emitted to the surrounding environment by dissolving smoke, muffling noise and shielding harmful rays. Once the cutting operation is completed, the water table E must be lowered to the storage position, shown in FIG. 6, so that the drive mechanism 10 can be energized and the processing conveyor C can transport material F to an unloading area. This is accomplished by simply deenergizing hydraulic actuators 66. Also, the operator must deenergize pneumatic actuators 82 to prevent pistons 88 from obstructing the movement of endless belt 8. Guide rollers 60 and corresponding guide brackets 70 prevent longitudinal movement of the water table E when the same is vertically displaced between the storage position and operating position. The guide rollers 69 and the support bars operably associated therewith prevent lateral movement of the water table E.

The in line material handling system of the present invention achieves several advantages over the previously known material handling systems. The water table E of the present invention does not use an elaborate end wall system to permit the same to receive the endless belt 8 and thus is significantly less expensive to manufacture. Further, the water level in the water table E can be maintained at a constant level in both the storage and operating positions. This obviates the need for raising the water level once the material F is positioned above the water table E increasing the overall efficiency of the material handling system. Additionally, the chain sprockets 12 and 14 do not experience corrosion due to exposure to the water contained within the water table E or the by-products produced during the cutting operation. a preferred design, it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention and the limits of the appended claims.

What is claimed is:

1. A material handling system, comprising:
   a. means for conveying the material from a loading area to an operating area and subsequently to an unloading area;
   b. a liquid containing means positioned underneath said conveying means for minimizing the pollution emitted by said material handling system and including front, rear and side walls;
   c. means for driving said conveying means;
   d. means for connecting said drive means to said conveying means;
   e. said liquid containing means front and rear walls being positioned inwardly from and extending along at least a portion of said drive means;
   f. said connecting means including means for receiving said front and rear walls of said liquid containing means such that the corresponding drive means is free from exposure to any liquid in said liquid containing means; and
   g. means for permitting said conveying and said liquid containing means to be moved relative to each other.

2. A material handling system as in claim 1, wherein:
   a. said drive means includes a drive sprocket means, a driven sprocket means, and a motor drivingly connected to said drive sprocket means.

3. A material handling system as in claim 1, wherein:
   a. said relative means includes means for vertically displacing said liquid containing means between an operating position and a storage position.

4. A material handling system as in claim 2, wherein:
   a. said drive means includes first and second chains:
   b. said first and second chains each include a plurality of rollers;
   c. at least a first link extending between adjacent rollers; and
   d. means for rotatably securing said rollers to the corresponding links.

5. A material handling system as in claim 4, wherein:
   a. said front and rear walls of said liquid containing means are positioned inwardly of said first and second chains respectively.

6. A material handling system as in claim 5, wherein:
   a. said front and rear walls of said liquid containing means extend substantially parallel to said first and second chains respectively.

7. A material handling system as in claim 1, wherein:
   a. said conveying means includes a first conveyor;
   b. said first conveyor is an endless belt; and
   c. means for supporting said endless belt above the ground.

8. A material handling system as in claim 7, wherein:
   a. said supporting means for said endless belt includes first and second side walls having a plurality of cross beams extending therebetween;
   b. said supporting means further includes first and second I-beams supported on said cross beams and are positioned adjacent said first and second side walls of said support means; and
   c. at least a portion of said first and second chains extend along said first and second I-beams respectively.

9. A material handling system as in claim 8, wherein:

a. said first and second side walls of said supporting means for said endless belt extend substantially parallel to said front and rear walls of said liquid containing means respectively.

10. A material handling system as in claim 9, wherein:
a. said first and second I-beams extend substantially parallel to said front and rear walls of said liquid containing means respectively.

11. A material handling system as in claim 8, wherein:
a. said first and second side walls have a shoulder formed therein for supporting at least a portion of said first and second chains respectively.

12. A material handling system as in claim 1, wherein:
a. said conveying means includes a first conveyor and a material supporting means;
b. said first conveyor includes at least first and second sections free from said material supporting means for permitting said side walls of said liquid containing means to pass through said first conveyor.

13. A material handling system as in claim 1, wherein:
a. said liquid containing means is a water table.

14. A material handling system as in claim 1, wherein:
a. said conveying means includes a first and second conveyors; and
b. said first and second conveyors are operably associated with each other.

15. A material handling system as in claim 3, wherein:
a. said receiving means of said connecting means includes at least a first vertically extending wall; and
b. said vertically extending wall of said receiving means extends upwardly a distance greater than said front and rear walls of said liquid containing means in said operating position.

16. A material handling system as in claim 15, wherein:
a. said receiving means includes a second vertically extending wall; and
b. said first and second walls of said receiving means are spaced a distance greater than the thickness of said side walls of said liquid containing means.

17. A material handling system as in claim 16, wherein:
a. said receiving means includes an arcuate upper portion connecting said vertical walls of said receiving means.

18. A material handling system as in claim 17, wherein:
a. said receiving means of said connecting means is substantially U-shaped.

19. A material handling system as in claim 16, wherein:
a. said drive means includes first and second chains,
b. said conveying means includes material supporting means;
c. said first and second chains each include a plurality of rollers, at least a first link extending between adjacent rollers, and means for rotatably securing said rollers to the corresponding links;
d. said first wall of said receiving means is secured to a corresponding link of said chains; and
e. said second wall of said receiving means is secured to one end of a corresponding said material supporting means of said conveying means such that at least a portion of said second wall and said corresponding material supporting means are immersed in the liquid in said liquid containing means when in said operating position.

20. A material handling system as in claim 19, wherein:
a. said material supporting means of said conveying means each includes an I-beam and a substantially horizontally extending platform secured thereto; and
b. said material supporting means furthr includes a pair of vertically extending slats secured to opposite ends of said platform.

21. A material handling system as in claim 3, wherein:
a. said vertical displacement means includes a plurality of hydraulic actuators.

22. A material handling system as in claim 1, and further comprising::
a. means for grounding said material handling system; and
b. said grounding means including a plurality of pneumatic actuators operably associated with said connecting means.

23. A material handling system as in claim 1, wherein:
a. guide means operably associated with at least one of said side walls for preventing lateral displacement of said liquid containing means.

24. A material handling system as in claim 23, wherein:
a. said guide means includes a roller rotatably secured to at least one of said side walls.

25. A material handling system as in claim 8, wherein:
a. means for cutting the material into a desired configuration is operably associated with said first conveyor;
b. said cutting means includes at least a first torch; and
c. said side walls of said supporting means includes tracks for permitting adjustment of said cutting torch along the y-axis of the material.

26. A material handling system, comprising:
a. means for conveying the material from a loading area to an operating area and subsequently to an unloading area;
b. a liquid containing means positioned underneath said conveying means for minimizing the pollution emitted by said material handling system and including front, rear and side walls;
c. means for displacing said liquid containing means between an operating position and a storage position;
d. said conveying means including at least at first conveyor;
e. means for driving said conveying means;
f. means for connecting said drive means to said conveying means;
g. said at least first conveyor including means for supporting the materials;
h. said liquid containing means front and rear walls being positioned inwardly from and extending along at least a portion of said drive means; and
i. said connecting means including means for receiving said front and rear walls of said liquid containing means when said liquid containing means is in said operating position such that said drive means is free from exposure to any liquid in said liquid containing means in said operating position.

27. A material handling system as in claim 26, wherein:
a. said drive means includes first and second chains;
b. said first and second chains each include a plurality of rollers;

c. at least a first link extending between adjacent rollers; and
d. means for rotatably securing said rollers to the corresponding links;
e. said front and rear walls of said liquid containing means are positioned inwardly of said first and second chains respectively.

28. A material handling system as in claim 26, wherein:
   a. said first conveyor includes at least first and second sections free from said material supporting means for permitting said side walls of said liquid containing means to pass through said first conveyor.

29. A material handling system as in claim 26, wherein:
   a. said receiving means of said connecting means includes first and second vertically extending walls; and
   b. said first and second vertically extending walls of said receiving means extend upwardly a distance greater than said front and rear walls of said liquid containing means and are spaced a distance greater than the thickness of said front and rear walls of said liquid containing means.

30. A material handling system as in claim 29, wherein:
   a. said receiving means includes an arcuate upper portion connecting said vertical walls of said connecting means.

31. A material handling system as in claim 30, wherein:
   a. said receiving means of said connecting means is substantially U-shaped.

* * * * *